(12) United States Patent
Wölfing et al.

(10) Patent No.: US 10,813,185 B2
(45) Date of Patent: Oct. 20, 2020

(54) SEMICONDUCTOR-BASED LIGHTING DEVICE

(71) Applicant: SCHOTT AG, Mainz (DE)

(72) Inventors: Bernd Wölfing, Mainz (DE); Thomas Reichert, Wackernheim (DE); Achim Weil, Immesheim (DE); Andreas Jurk, Monsheim (DE); Björn Bleisinger, Riesweiler (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 16/379,670

(22) Filed: Apr. 9, 2019

(65) Prior Publication Data

US 2019/0313497 A1    Oct. 10, 2019

(30) Foreign Application Priority Data

Apr. 9, 2018   (DE) .................. 10 2018 108 278

(51) Int. Cl.
*H05B 45/10* (2020.01)
*B60Q 3/76* (2017.01)
(Continued)

(52) U.S. Cl.
CPC .............. *H05B 45/10* (2020.01); *B60Q 3/12* (2017.02); *B60Q 3/18* (2017.02); *B60Q 3/76* (2017.02);
(Continued)

(58) Field of Classification Search
CPC ...... H05B 45/10; H05B 47/16; H05B 47/175; G06F 3/0338; G06F 3/0488; G06F 3/04847; G06F 2203/0339; G06F 3/03547; B60Q 3/12; B60Q 3/18; B60Q 3/76; B60Q 3/82; B60Q 3/47; B60Q 3/85; B60Q 3/44;
(Continued)

(56) References Cited

U.S. PATENT DOCUMENTS 6,796,690 B2 * 9/2004 Bohlander ......... H05B 33/0812
                                                      362/471
7,253,744 B2 * 8/2007 Colacecchi ............ B64D 11/00
                                                      340/686.1
(Continued)

FOREIGN PATENT DOCUMENTS

DE          10251133        7/2004
DE        102006048711      4/2008
(Continued)

*Primary Examiner* — Peggy A Neils
(74) *Attorney, Agent, or Firm* — Ohlandt, Greeley, Ruggiero & Perle, L.L.P.

(57) ABSTRACT

A lighting device is provided that has a light source arrangement with a plurality of semiconductor-based light sources in the form of light-emitting diodes. The light sources are bundled or collimated such that they each emit light in differently directed light cones with adjacent light cones overlapping. The lighting device has an adjusting device for adjustment of the direction of illumination and an actuating circuit connected to the adjusting device. The adjusting device adjusts intermediate stages for which the light-emitting diodes of adjacent and overlapping light cones operate and with varying light intensity in such a way the focal point of the light field produced by the light-emitting diodes lies between the focal points of adjacent light cones.

21 Claims, 8 Drawing Sheets

(51) Int. Cl.

| | |
|---|---|
| *F21S 8/04* | (2006.01) |
| *F21V 23/00* | (2015.01) |
| *G06F 3/0338* | (2013.01) |
| *B60Q 3/12* | (2017.01) |
| *F21V 14/02* | (2006.01) |
| *F21V 23/04* | (2006.01) |
| *B60Q 3/18* | (2017.01) |
| *G06F 3/0488* | (2013.01) |
| *H05B 47/16* | (2020.01) |
| *H05B 47/175* | (2020.01) |
| *F21Y 115/10* | (2016.01) |
| *F21W 131/301* | (2006.01) |
| *B60Q 3/82* | (2017.01) |
| *F21W 106/00* | (2018.01) |
| *G06F 3/0484* | (2013.01) |
| *F21Y 113/00* | (2016.01) |

(52) U.S. Cl.
CPC .............. *F21S 8/04* (2013.01); *F21V 14/02* (2013.01); *F21V 23/003* (2013.01); *F21V 23/0485* (2013.01); *G06F 3/0338* (2013.01); *G06F 3/0488* (2013.01); *H05B 47/16* (2020.01); *H05B 47/175* (2020.01); *B60Q 3/82* (2017.02); *B60Y 2200/30* (2013.01); *B60Y 2200/51* (2013.01); *F21W 2106/00* (2018.01); *F21W 2131/301* (2013.01); *F21Y 2113/00* (2013.01); *F21Y 2115/10* (2016.08); *G06F 3/04847* (2013.01)

(58) Field of Classification Search
CPC ....... F21V 14/02; F21S 8/04; F21W 2106/00; F21W 2131/301; H03K 17/9631
See application file for complete search history.

(56) References Cited

U.S. PATENT DOCUMENTS

| | | | | |
|---|---|---|---|---|
| 7,413,327 | B2 * | 8/2008 | Guard | B64D 11/00 340/815.45 |
| 9,587,805 | B2 * | 3/2017 | Ryu | F21V 29/767 |
| 10,144,512 | B2 * | 12/2018 | Gagnon | B60Q 3/82 |
| 10,272,833 | B2 * | 4/2019 | Snider | B60Q 3/208 |
| 2006/0044800 | A1 | 3/2006 | Reime | |
| 2008/0089079 | A1 | 4/2008 | Gunnewig | |
| 2011/0235350 | A1 | 9/2011 | Kessler | |
| 2012/0087142 | A1 | 4/2012 | Schultheis | |
| 2013/0141009 | A1 * | 6/2013 | Jin | H05B 33/0863 315/292 |
| 2013/0250590 | A1 | 9/2013 | Schenk | |
| 2014/0341588 | A1 * | 11/2014 | Pederson | H04B 10/40 398/128 |
| 2016/0123564 | A1 | 5/2016 | Quilici | |

FOREIGN PATENT DOCUMENTS

| | | |
|---|---|---|
| DE | 102008055812 | 2/2011 |
| DE | 102015203890 | 9/2016 |
| EP | 2439105 | 4/2012 |
| GB | 2473311 | 3/2011 |
| WO | 2007072316 | 6/2007 |

\* cited by examiner

SEMICONDUCTOR-BASED LIGHTING DEVICE

CROSS REFERENCE TO RELATED APPLICATIONS

This application claims benefit under 35 USC § 119 of German Application 10 2018 108 278.9, filed Apr. 9, 2018, the entire content of which are incorporated herein by reference.

BACKGROUND

1. Field of the Invention

The invention generally relates to semiconductor-based lighting devices. In particular, the invention relates to lights with a spatially variable light field.

2. Description of Related Art

Lights that are adjustable in regard to the site to be illuminated are utilized, in particular, as reading lights. The direction of illumination and thus the site to be illuminated should thereby be easily adjustable in order to provide a local illumination, on the one hand, and to be able to be adapted to the changing positions of the user, on the other hand. In order to achieve this, the lamps are equipped with a movable head, which allows the light cone produced by the lamp to be pivoted. Such a reading lamp is described, for example, in EP 2 439 105 A2. This reading lamp has a light source and a movable cover to which the light source can be attached. Through operation of an actuator element, the cover and the light source can be moved around the longitudinal axis of the reading lamp and, through operation of the cover, around a transverse axis extending perpendicularly to the longitudinal axis. In general, during the movement of the light source, there is the drawback that the mechanical elements utilized for this purpose are subject to wear or necessitate a certain amount of maintenance expense.

DE 10 2008 055 812 B4 provides another solution. This patent describes an overhead reading light system for a passenger seat. The reading light has a first plurality of immobile light sources, the central axes of which lie in a first plane and are inclined toward one another, and a second plurality of light sources, the central axes of which lie in a second plane and are inclined toward one another, with the second row being parallel to the first row, wherein an actuating device is connected to the first and second plurality of light sources and is set up to actuate, as desired, one of the light sources in each case. A detection device for detecting a position of the passenger seat is provided, wherein the actuating device automatically actuates, as desired, one of the light sources depending on the position of the passenger seat detected by the detection device. An arrangement of this kind necessitates a large number of light sources, which, for the most part, are not utilized. Accordingly, the arrangement is relatively large and complicated.

SUMMARY

The invention is therefore based on the object of specifying a lighting device that is compact and of low sensitivity and low maintenance and allows the field of illumination or light field to be simply aligned.

In accordance herewith, the invention provides a lighting device having a light source arrangement with a plurality of semiconductor-based light sources in the form of light-emitting diodes, which are collimated in such a way that they each emit light in differently directed light cones, such that adjacent light cones overlap, and wherein the lighting device has an adjusting device for emitting an actuating signal for the adjustment of the direction of illumination and an actuating circuit, which is connected to the adjusting device, wherein the adjusting device can adjust intermediate stages for which the light-emitting diodes of adjacent and overlapping light cones can be operated by the actuating circuit jointly and with varying light intensity in such a way that, for the intermediate stages, the central axis or the focal point of the light field produced by the light-emitting diodes lies in each case between the central axes or the focal points of adjacent light cones.

Accordingly, the light-emitting diodes of a lighting device according to the invention are not discretely switched on or off in order to achieve a certain direction of illumination or the illumination of an intended region. Instead, adjacent light fields with different intensity are superimposed in order to obtain overall a light field that, locally or in terms of direction, lies between the adjacent light fields of individually operated light-emitting diodes that radiate in different directions. In this way, it is possible, even using a relatively small number of light-emitting diodes, to achieve a continuous or at least quasi-continuous alignment of the direction of illumination. The lighting device can preferably be designed as a reading light.

In the sense of this disclosure, the term "collimated" does not designate a strictly parallel direction, which would only be possible theoretically with ideal punctiform light sources, but rather the generation of directed light in general, namely of light that is emitted in said light cones. In this disclosure, the term "collimated" is thus also used synonymously with the term "directed" or "bundled". Accordingly, the lighting device of this disclosure can also be described as follows: Provided is a lighting device having a light source arrangement with a plurality of semiconductor-based light sources in the form of light-emitting diodes, the emitted light of which is bundled, so that it forms differently directed light cones that overlap in a light field, wherein the lighting device has an adjusting device for the output of an actuating signal for adjusting the lighting device and an actuating circuit that is connected to the adjusting device, wherein intermediate stages can be adjusted with the adjusting device, in which light-emitting diodes of adjacent and overlapping light cones can be operated jointly and with variable light intensity by the actuating circuit, so that the focal point of the light field produced by the light-emitting diodes in the case of the intermediate stages lies between the focal points of adjacent light cones.

Thus, for the lighting device, in a preferred manner, even in the case of stationary light cones, a spatial adjustment of the illumination field can be produced by varying the brightness of the individual light cones in the intermediate stages. A spatially fixed or stationary light field can also be produced with the adjustment, wherein these adjustments can be modified according to specifications, for example, for any configuration of the lighting device. According to one embodiment, for this purpose, the lighting device is configured prior to utilization, for example, as a reading light, so that it permanently illuminates a specific region. In simplest embodiment then, a control element that is accessible to the user for moving the light field also does not need to be provided.

This spatial adjustment, however, may also comprise a movement, in particular, a pivoting of the light field.

In any case, the movement of the light field is preferably not effected by pivoting—or at least is not effected only by pivoting—one or more light cones, but rather by a brightness adjustment. It is thus particularly provided that the light sources in each case irradiate light in an immobile light cone and are preferably arranged in a stationary manner.

It would be conceivable, for instance, to input the desired position or direction of the light field in a form of coordinates, such as, for example, as a number within a range of numbers representing the different directions, into the adjusting device. An especially intuitive operation can be achieved, however, when the adjusting device and the actuating circuit interact in such a way that, with each successive operation of the actuating means, the focal point of the light field moves rectilinearly, for example, in one direction. A further, especially preferred possibility is to provide an adjusting device that comprises a sliding adjustment device or a rotary adjustment device, wherein the adjusting device and the actuating circuit interact in such a way that different slide settings or rotary settings of the slide adjustment device or rotary adjustment device correspond to different directions of illumination.

Not only should it be possible to move the position of the region illuminated by the lighting device as smoothly as possible into intermediate positions between the positions of light spots or illuminated regions by means of the invention. It would also be desirable here to bring about the adjustment of different positions insofar as possible without noticeable fluctuations in brightness. For this purpose, in an enhancement of the invention, it is provided that the actuating circuit is designed to actuate the light-emitting diodes in such a way that the brightness of the light field in the different intermediate stages remains constant or fluctuates by at most 20%, preferably at most 10%. In accordance with another, alternative or additional embodiment, the adjustment of the light-emitting diodes by the actuating circuit, typically by way of the currents, can also occur in such a way that the mid-point brightness or maximum brightness remains constant in the intermediate positions or intermediate stages or fluctuates by at most 20%, preferably by at most 10%. Under certain circumstances, a fluctuation of the maximum brightness, typically in the middle of the light field or in the vicinity of the focal point, can be more clearly perceived than a fluctuation of the total brightness.

In accordance with an enhancement of the invention, the actuating circuit is additionally designed such that, in response to the change in an actuating value of the actuating element, an adjustment of an intermediate setting is made with a time delay in such a way that the brightnesses of the light-emitting diodes are adjusted gradually over time or in a plurality of intermediate settings. Not only is a more convenient operation thereby achieved, but the gradual adjustment also makes it easier for an operator to find an optimal illumination.

The invention will be described below in detail and on the basis of the drawings. In the drawings, identical reference numbers each refer to identical or corresponding elements.

DETAILED DESCRIPTION

Figure 1:
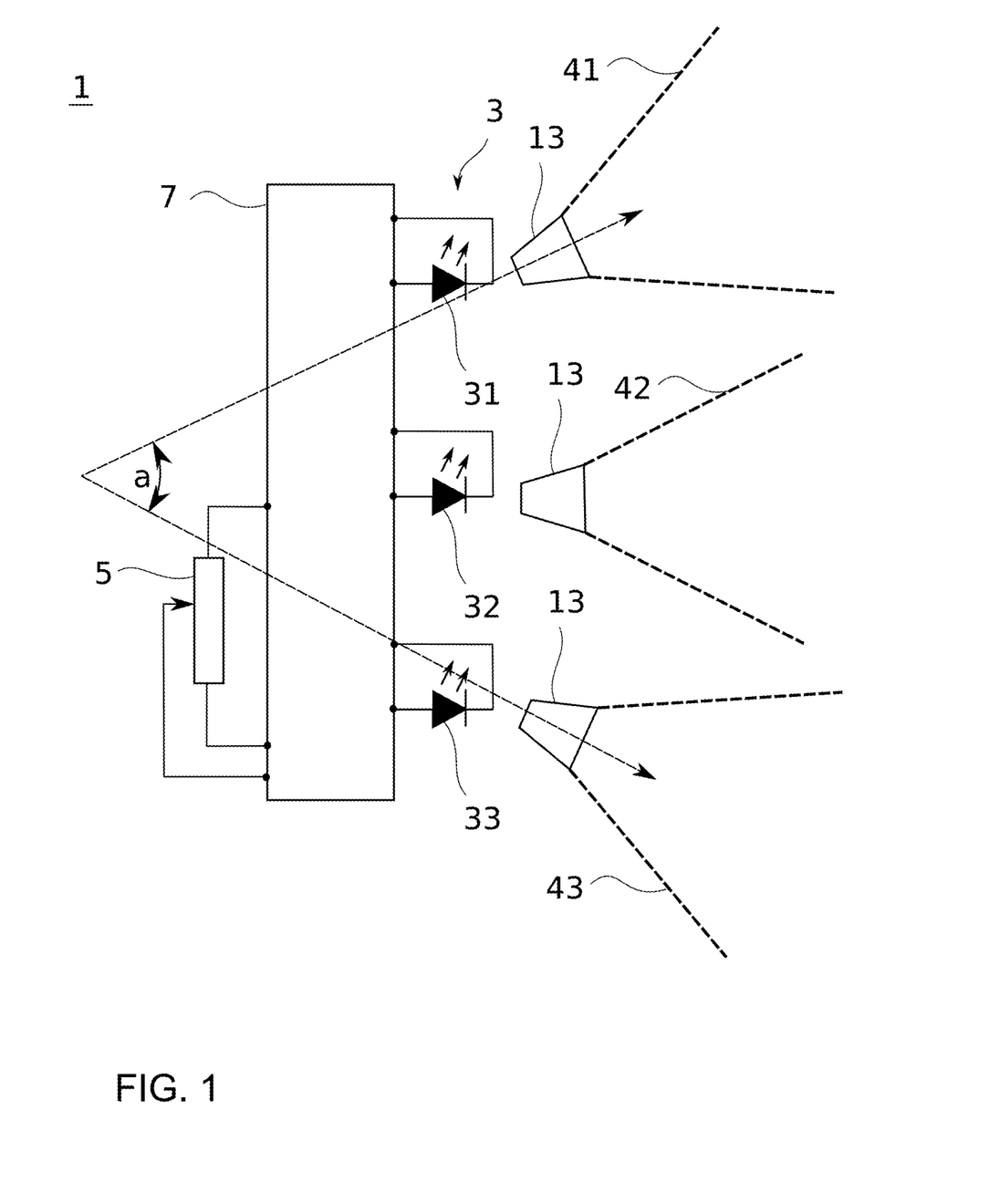
FIG. 1 shows a lighting device.

Schematically illustrated in FIG. 1 is a lighting device 1 in accordance with the invention with several basic components.

The lighting device 1 comprises a light source arrangement 3 with a plurality of semiconductor-based light sources in the form of light-emitting diodes 31, 32, 33. Provided is an actuating circuit 7 to which the light-emitting diodes 31, 32, 33 are connected, wherein the light-emitting diodes can be individually actuated for the emission of different light intensities. The light sources are preferably arranged rigidly or are immobile. However, this does not exclude the fact that the light sources nevertheless have an adjustment option, for example, for alignment. Due to the stationary arrangement, the emitted light cones are immobile with respect to the lighting device. The lighting device 1 makes possible, however, a movable light field, or, in general, an adjustment of the spatial position of the light field due to its mode of operation that is explained in more detail below.

An adjusting device 5 is connected to the actuating circuit 7. A simple possibility of such an adjusting device 5 would be, for example, a potentiometer, as illustrated. Also possible, however, is a plurality of adjusting devices 5, and the embodiment of FIG. 1 is not limited to a specific adjusting device. By use of the adjusting device 5, depending on the setting thereof or the duration or the kind of operation, an actuating signal is produced, on the basis of which the currents through the light-emitting diodes 31, 32, 33, and thus the light intensities thereof, are adjusted individually.

The potentiometer is an example of an adjusting device 5 that interacts with the actuating circuit 7 in such a way that, with each successive operation of the actuating means, the focal point of the light field or the central axis thereof progressively moves in one direction. If the rotary knob of the potentiometer is turned successively in one direction, the variation of the light intensities of the light-emitting diodes 31, 32, 33 causes the light field and thus the focal point or the central axis of the light field to migrate in one direction; when the rotation occurs in the opposite direction, the light field migrates back in the opposite direction. Moreover, a potentiometer represents an example of a sliding adjustment device or rotary adjustment device (depending on whether a sliding potentiometer or a rotary potentiometer is involved), whereby the adjusting device and the actuating circuit interact in such a way that different slide settings or rotary settings of the slide adjustment device or rotary adjustment device correspond to different directions of illumination.

The focal point is understood in the sense of the invention to mean the center point of the light distribution, which is obtained from the mean of the local positions of the light distribution weighted by the light intensity. The focal point can therefore also be referred to as the spatial intensity center point or focus. The central axis of a light cone or of the light field produced by one light cone or a plurality of light cones extends from the light source through the focal point, that is, the intensity center point.

The light-emitting diodes 31, 32, 33 are further furnished with collimation devices, which collimate or bundle the light of the light-emitting diodes 31, 32, 33 to form light cones 41, 42, 43 in each case. The collimation devices are also called light-bundling devices in the following. As schematically illustrated, the light cones 41, 42, 43 are generally directed differently by means of the light-bundling devices 13, so that the light-emitting diodes illuminate different regions on an illuminated object. The light-bundling devices 13 are designed in such a way that adjacent light cones, that is, the light cones that each have the most similar directions, overlap. In the illustration of FIG. 1, the light cones 41 and 42 and the light cones 42 and 43 are adjacent. Correspondingly, the regions of an illuminated object that are illuminated by the individual light-emitting diodes also overlap.

Because also the distance to the lighting device changes with the position of the light cone, the light-bundling devices 13 can be designed for different positions in such a way that they collimate the light to different extents, so that, at each desired position (direction and distance), a light spot of the same size is obtained. In order to minimize the additional effort and/or the risk of confusion between different elements during assembly, this can be achieved when collimating lenses are used, for example, by adjusting the distance to the light-emitting diodes.

The adjusting device 5 can then be used to adjust the actuating circuit 7 in one intermediate stage or a plurality of intermediate stages in such a way that the light-emitting diodes of adjacent light cones are simultaneously actuated and operated. The adjustment of an intermediate stage results in a light field with a focal point or central axis lying between the focal points or central axes of the light fields or light cones of the individual light-emitting diodes 31, 32, 33. Depending on the ratio of the light intensities of the light-emitting diodes, it is possible, in the intermediate stages, to shift the focal point of the illuminated region more toward one of the focal points of the regions illuminated by the individual light-emitting diodes.

In general, in the sense of the invention, the term light cone does not necessarily refer to a cone having a round cross section. A light cone is rather generally understood to mean a light field of any shape that widens with growing distance. Accordingly, the region of an illuminated object illuminated by a light-emitting diode need not be round, either.

Preferably, the angle α between the directions of the focal points or central axes of the light cones of maximum deviation, that is, for instance, between the maximum deviation to the left and the maximum deviation to the right, is 30° to 80°, preferably 35° to 55°. In the case of a mechanically pivotable light, this angle would correspond to the angle of pivot. In accordance with an embodiment, the angle α can also be set in relation to the number of different directions of the light cones. For the example shown in FIG. 1, given an angle of 30° to 60°, three light cones of differing directions exist. This means that each light cone spans 10° to 20° of the total angle α. In accordance with one embodiment of the invention, therefore, it is generally provided that the lighting device 1 comprises a plurality of light-emitting diodes 31, 32, 33, which have one light-bundling device or a plurality of light-bundling devices 13 and emit light in a plurality of light cones 41, 42, 43 of different directions, whereby, between the directions, an angle in the range of 10° to 20° is spanned. In this case, this embodiment is not limited, in particular, to the number of three light-emitting diodes or three light cones shown in FIG. 1.

Figure 2:
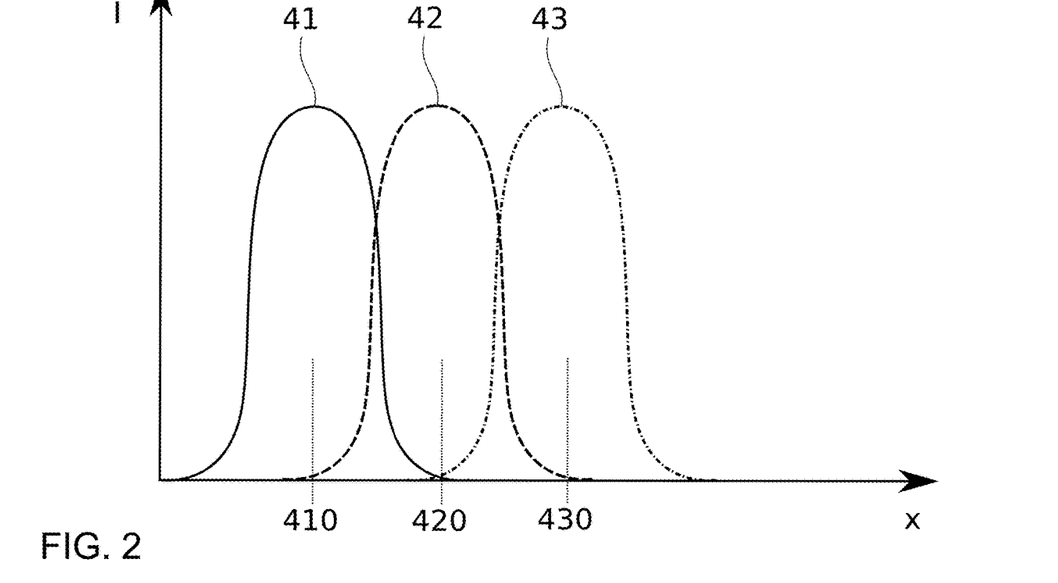
FIG. 2 shows a diagram of the intensity distributions of the light cones of the light-emitting diodes.

FIG. 2 schematically shows a diagram of the light intensities of the light cones 41, 42, 43 along a spatial coordinate x on an illuminated object, for example. As can be seen on the basis of FIG. 2, the focal points 410, 420, 430 of the light cones 41, 42, 43 are displaced on account of the different directions thereof along the spatial coordinate. Furthermore, it can also be seen that the adjacent light cones 41, 42 as well as 42, 43 overlap, so that, in general, without any limitation to the special diagram, a region between the adjacent focal points of the two adjacent light cones is illuminated in each case. The example is schematic also in regard to the overlap of the individual light cones. The overlap is relatively small. In practical application, it is generally appropriate to provide for a larger overlap, even though, optionally, a smaller overlap such as that illustrated, for instance, can also result in a pivotable light field that is acceptable from an esthetic standpoint.

Figure 3:
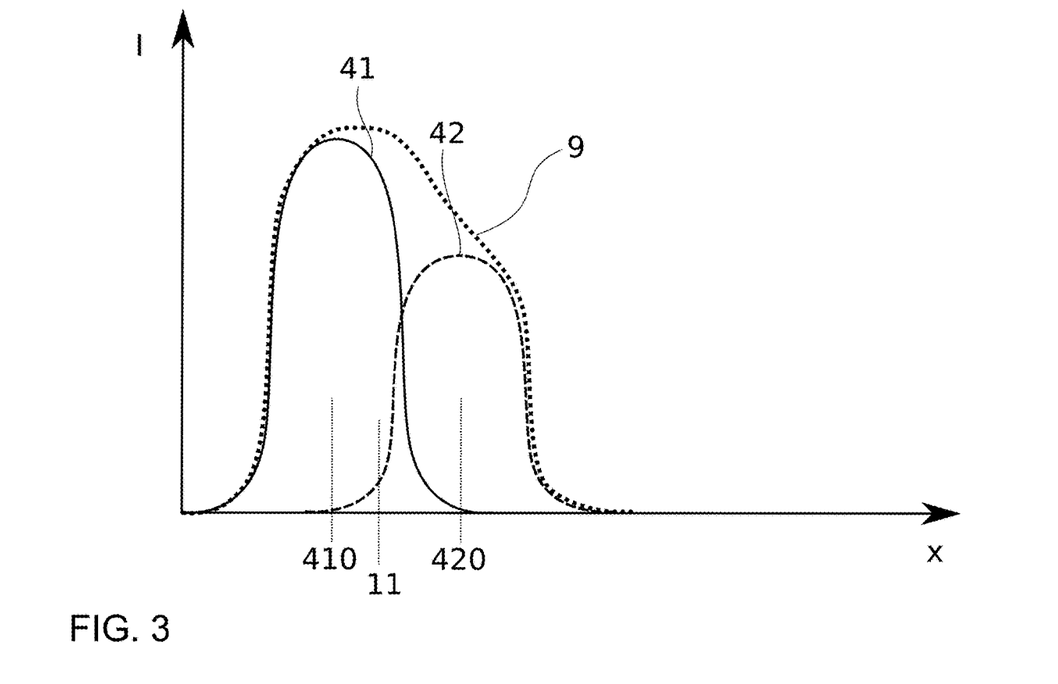
FIG. 3 shows, as a diagram, the superposition of two light cones.

Employing the same diagram illustration, FIG. 3 shows an intermediate stage in the illumination. In this example, the two light-emitting diodes 31, 32 are jointly operated, so that the light thereof is radiated in the overlapping light cones 41, 42. The light-emitting diodes can then be operated by means of the adjusting device 5 in such a way that the focal point of the light field produced by the light-emitting diodes 11 for adjustment of an intermediate stage lies between the focal points 410, 420 of the adjacent light cones 41, 42. In the illustrated example, an intermediate stage for which the light cone 42 has a smaller light intensity than the light cone 41 is adjusted. Accordingly, the focal point 11 of the light field 9 of the lighting device 1 for this adjustment is arranged between the focal points 410, 420 and is hereby shifted toward the focal point of the brighter light cone 410. The actuating circuit 7 is hereby set up in such a way that the respective currents through the light-emitting diodes 31, 32, 33 are chosen in such a way that the brightness of the light field 9 remains constant in different intermediate positions or fluctuates by at most 20%, preferably at most 10%. Consequently, in this case, the currents through the light-emitting diodes and accordingly the light intensities of the light cones 41, 42 are reduced in comparison to the case when a light cone is produced using only one of the light-emitting diodes. In accordance with another, alternative or additional embodiment, the adjustment of the currents can also be made in such a way that the mid-point brightness or maximum brightness remains constant in the intermediate positions or fluctuates by at most 20%, preferably by at most 10%.

If another intermediate setting is to be approached in order to align the light field 9 onto a specific region to be illuminated, the intensities of the light cones 41, 42, 43 are correspondingly adjusted, for example, by further reducing the current through the light-emitting diode 32 and further increasing the current through the light-emitting diode 31, in order to shift the focal point of the light field 9 further in the direction of the focal point 410 of the light cone 41 produced by the light-emitting diode 31. In accordance with one embodiment, this adaptation and readjustment can occur instead of an abrupt adjustment of the new parameters and, in particular, can occur gradually. For this purpose, in the case of an operation of the actuating element 5 and, accordingly, of the change in the actuating value, the actuating circuit 7 can be set up to make an adjustment in an intermediate setting or in the new parameters with a time delay by gradually adjusting the brightness of the light-emitting diodes 31, 32, 33, insofar as they are involved, over time or in a plurality of successive intermediate settings. In accordance with an enhancement of the invention, the time delay and/or the parameters for actuation of the light-emitting diodes can be calculated over the various adjustable positions in a microcontroller and/or deposited as a value in a memory of the actuating circuit.

In the example of FIG. 1, three light-emitting diodes 31, 32, 33 are provided. The example of FIG. 3 also shows, however, that a shift of the light field 9 or of the focal point 11 thereof in accordance with the invention is possible in a straightforward manner even with two light-emitting diodes.

A great advantage of the invention is that the alignment of the light field can be produced without any mechanical parts. This makes possible not only a compact structure, but also a robust and easily cleanable configuration. It is possible to dispense entirely with protruding mechanical components, which are difficult to clean and ultimately increase the risk of injury, especially also when they are used in vehicle compartments or aircraft cabins. These advantages are manifested especially when, as in a preferred embodiment of the invention, the lighting device has a front panel, behind which the light-emitting diodes are arranged. In particular, in this case, the lighting device can also be designed as a recessed light fixture with a front panel.

Figure 4:
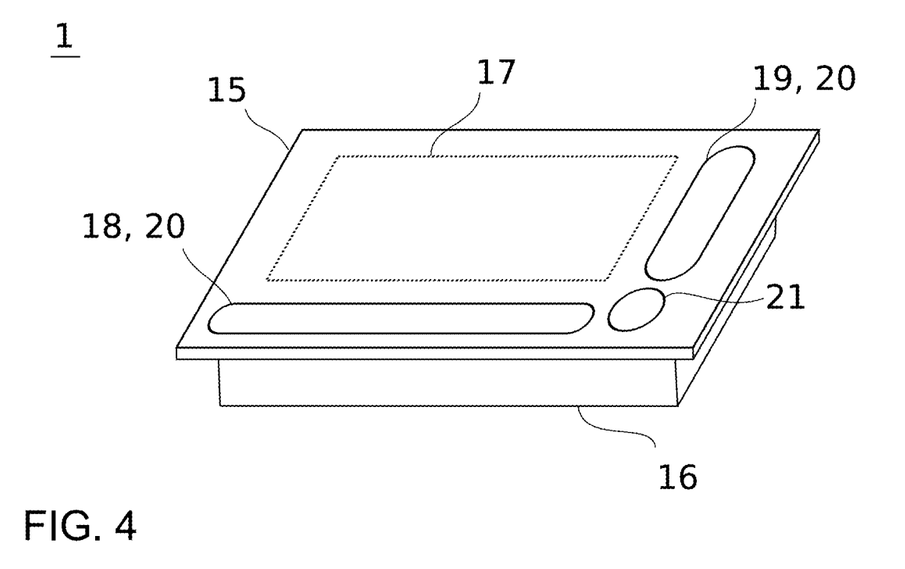
FIG. 4 represents an embodiment of a lighting device having a front panel.

FIG. 4 shows such an embodiment. The recessed light fixture comprises a housing 16 with an attached front panel 15. The light-emitting diodes are arranged in the housing 16 and, during operation, beam through the front panel 15. Preferably, the actuating circuit 7 is also accommodated in the housing 16. For a compact construction, it is generally advantageous, without any limitation to the special illustrated example, when the front panel 15 has a control element or when a control element is integrated in the front panel 15 and can be operated by the adjusting device. In accordance with a preferred enhancement of the invention, the control element comprises a touch element. In other words, the control element is designed as a touch control element. In order to adjust the direction of the illumination, as is achieved by using the arrangement according to the invention and by actuating the light-emitting diodes, a touch-sensitive sliding control (a so-called "slider") is especially advantageous for an intuitive controllability. In the embodiment shown in FIG. 4, a control element 18 is provided in the form of a touch-sensitive slider 20 in order to operate the adjusting device 5 or, more generally, in order to produce actuating values for adjusting the beaming direction of the lighting device 1. The embodiment with a common front panel for a plurality of light sources makes possible a very flat construction just by the operating mode with stationary light sources and movement of the light field by adjustment of intermediate stages. Clear advantages result directly as installed lights in vehicles or passenger cabins. Conventional reading lights or seat lights that make possible a movement of the light field by mechanical pivoting generally have protruding parts for this purpose in order to make possible the actuation for pivoting the light. However, these protruding parts in the constricted space, for example, of an aircraft passenger cabin may lead to unpleasant shocks when standing up from the seat. In contrast, the lighting device in the form of an installed light with the common front panel can be installed on one level with the casing.

Accordingly, in one embodiment, a lighting device 1 is also provided, which has a plurality of light sources, in particular a plurality of semiconductor-based light sources in the form of light-emitting diodes, as well as a common front panel for the plurality of light sources, wherein the front panel is at least partially transparent, so that the light irradiated from the light sources can reach the outside through the front panel, wherein at least the transparent regions of the front panel are manufactured from glass or plastics. This embodiment of the lighting device is also independent from the operating mode with permanently installed light-emitting diodes and a movement of the lighting field by adjustment of intermediate stages of brightness. Preferably, the light-emitting diodes, however, are installed in turn so that they irradiate light in light cones of different directions. Other mechanisms can also be provided in order to move the light field of the beamed light. In the simplest case, the light sources can also simply emit light in stationary manner in an immobile light field pre-adjusted with respect to its spatial position. A control for the user for moving the light field then does not need to be provided in the simplest configuration. Optionally, opaque regions of the front panel can be present owing to opaque sections of the support material of the front panel or through opaque coatings. Preferably, the front panel is flat or bent uniaxially in order to be well matched to the shape of the larger casing parts into which the light is installed. Optionally, control elements such as those provided also in the examples of FIG. 4 and FIG. 5 can also be present. Especially in this case, as mentioned, touch control elements are offered in order to keep flat the surface of the front panel. The above-described lighting device with common front panel is particularly well suitable as a reading light, so as to be installed in a casing. The embodiment of a touch-sensitive slider 20 is not limited to a recessed light fixture with a front panel 15 as a lighting device 1. Instead, such a control element can also be utilized in other configurations. Accordingly, in a embodiment, generally a touch-sensitive control element 18, preferably a touch-sensitive slider, is provided for the operation of the adjusting device 5. Said touch-sensitive slider can be separated from the recessed light fixture, being, for example, in the form of a control element in an armrest and/or in the form of a remote control and/or as a control element in an entertainment system having, for example, a touch-sensitive screen.

In general, it is useful when the lighting device has additional control possibilities. Preferably, an on-off switch element 21 is also provided. In the case of an integration in the front panel 15, said switch element can also be designed as a touch-sensitive control element.

Generally advantageous is also another adjusting device, which is connected to the actuating circuit 7 and is intended to adjust the brightness of the light-emitting diodes 31, 32, 33, or the overall emitted light intensity. In the example shown in FIG. 4, another control element 19 is provided in the form of a touch-sensitive slider 20 in order to be able to adjust the brightness of the lighting device 1.

Figure 5:
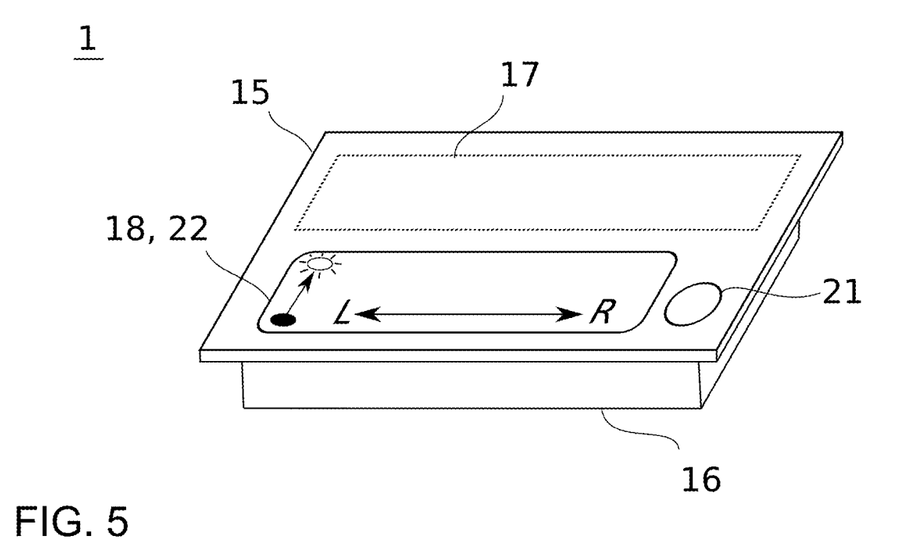
FIG. 5 shows a variant of the embodiment illustrated in FIG. 4.

FIG. 5 shows a variant of the embodiment in accordance with FIG. 4. This variant, too, is designed as a recessed light fixture having a front panel 15. In this variant, no separate control elements 18, 19 for brightness and direction are provided. Instead, a single control element 18 is present as a two-dimensional control field in the form of a touch-sensitive matrix controller 22. In this case, it is possible, as highlighted by the symbol designation on the control field, to adjust the brightness by way of the position of the touch in the one direction of illumination and in the direction perpendicular thereto.

In certain applied cases, it is advantageous when the control element is not integrated in the housing or when an additional control element, which is separate from the recessed light fixture, is provided. This applies in cases in which the light can be poorly reached from the seated or reclining position because, for example, no installation space is available in a favorable position, because a favorable position is not desirable for reasons of design aesthetics, or because an easily reachable position is not favorable. This can also be the case when a person is limited in movement—for example, in a hospital bed—but can change his or her position through the possibilities of electrically adjusting the position of the bed in order to thereby also adjust, as required, the direction of illumination for the particular situation. In these cases, a motor would be necessary for a mechanically adjustable light, in order to change the adjustment of the light cone upon signal of the control device (18,19). For example, such a control element can be integrated in an armrest of a seat that is to be illuminated using the lighting device. According to yet another embodiment, the control element can comprise a remote control.

For aesthetic reasons, the front panel 15 can be opaque. It is then possible to provide a window 17, behind which the light-emitting diodes 31, 32, 33 are arranged and which allows passage of the light of the light-emitting diodes. For aesthetic reasons, the window 17, on its part, can be furnished with a coating or a masking in order to achieve a so-called dead-front effect. In this case, the interior of the lighting device can be concealed to the observer by the coating or masking, but the light-emitting diodes can illuminate through the coating or masking. An example is a semitransparent coating, which adequately darkens the interior of the housing. Another example is a masking in the form of a structured coating, which—for example, in a grid pattern—leaves small regions of the panel free, through which the light of the light-emitting diodes can pass.

Figure 6:
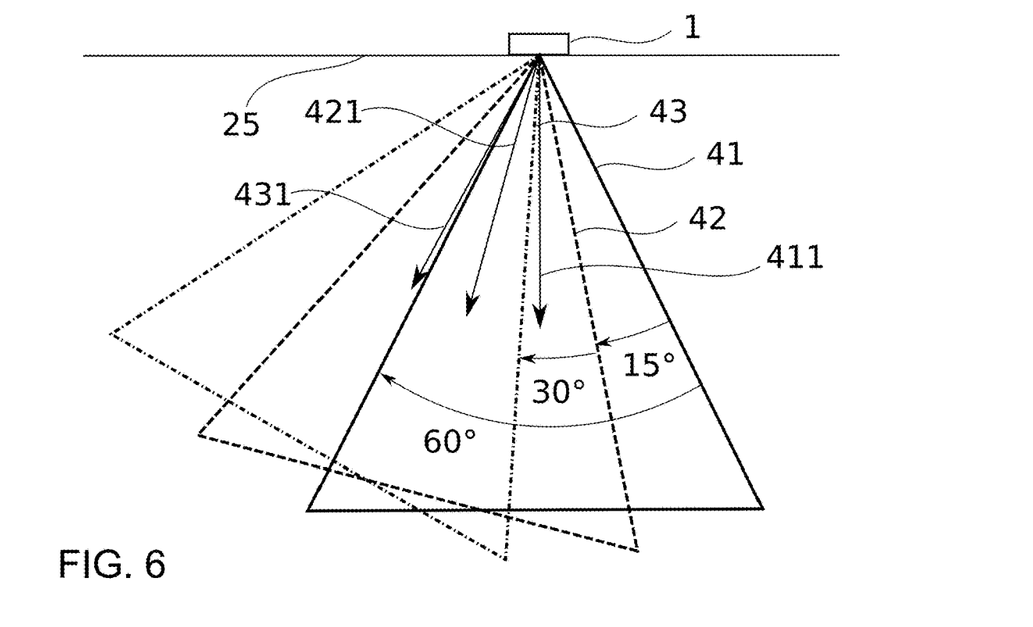
FIG. 6 shows an exemplary embodiment of a lighting device 1 with the light cones radiated by the light-emitting diodes.

FIG. 6 shows an exemplary embodiment for the configuration of the illumination parameters of a lighting device 1 according to the invention. Solely by way of example, the lighting device 1 is designed as a ceiling light, which can be installed in a ceiling 25 of the passenger compartment of a vehicle or an airplane cabin. The light-emitting diodes of the lighting device radiate light cones 41, 42, 43, which each have an aperture angle of 60°. In this example, the directions of adjacent light cones that overlap each other each have an angle of 15°. Accordingly, the direction of the light cone 43 with respect to the light cone 41 has an angle of 30°. As can be seen in this exemplary embodiment, not only do the adjacent light cones overlap, but also the next light cones in succession, that is, in the illustrated example, the light cones 41 and 43, also overlap. In general, without any limitation to the illustrated example, it is provided for this purpose in an embodiment of the invention that at least a part of the light-emitting diodes 31, 32, 33 are collimated in such a way that the opening angle of the light cones 41, 42, 43 is larger than the angle between the light cones or between the mid-point axes 411, 421, 431 of the light cones.

In accordance with another embodiment, also realized in the exemplary embodiment of FIG. 6, the light-emitting diodes 31, 32, 33 are collimated in such a way that the angle between adjacent light cones is at most equal to half of the aperture angle of the light cones 41, 42, 43.

In accordance with another embodiment, the overlap can also be expressed in such a way that at least a part of the light-emitting diodes 31, 32, 33 is collimated in such a way that at least one of the light cones overlaps both with a second, adjacent light cone and with a third light cone that is next in succession or adjacent to the second light cone. Regarded as an adjacent light cone is a light cone that, for a specific sense of direction of the angle measurement with respect to the observed light cone, assumes the smallest angle of its beam direction or the mid-point axis thereof assumes the smallest angle with respect to the mid-point axis of the observed light cone.

The above-described features serve to achieve a smooth transition of the shape of the light field when the light field is moved or when the resulting light cone is pivoted into intermediate positions. For this purpose, it is generally also advantageous when the light cone produced by the individual light-emitting diodes or the light spot on the illuminated object is not delimited too sharply. A so-called top-hat profile with a sharp border is accordingly rather detrimental.

Figure 7:
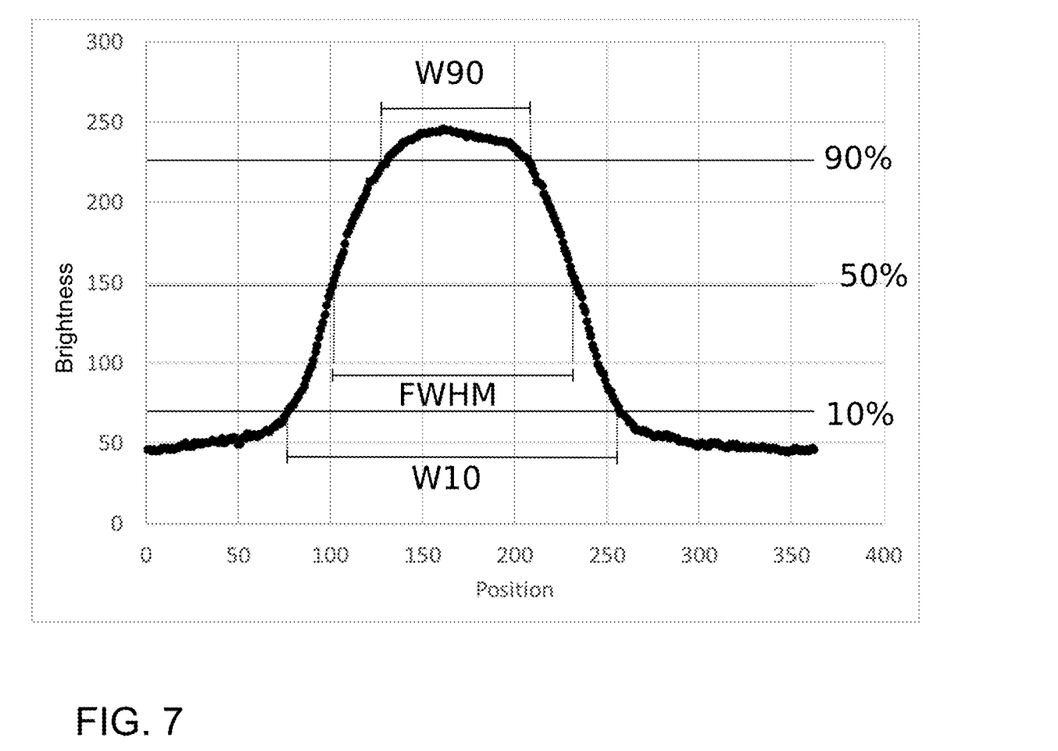
FIG. 7 is a diagram of the brightness curve of the light field produced by a light-emitting diode.
Figure 8:
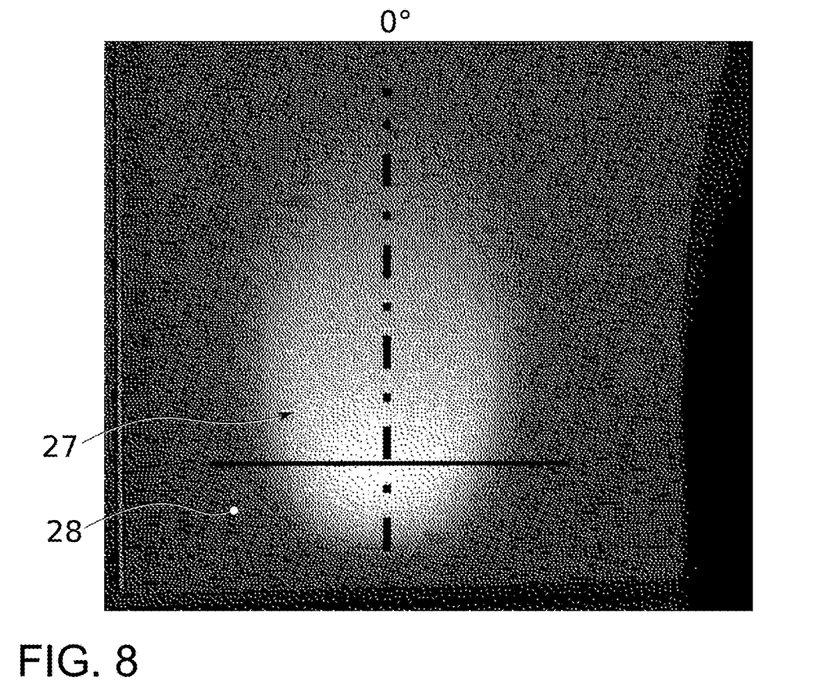
FIG. 8 to FIG. 11 show photographic images of the region on a surface illuminated by a lighting device.

For this purpose, FIG. 7 shows a brightness curve on an illuminated surface along a line, such as produced by one of the collimated light-emitting diodes. FIG. 8 shows a photographic image of the associated light spot 27 on a surface 28 illuminated by the lighting device 1. The line along which the brightness curve was extracted from the gray-scale values of the image is inscribed in FIG. 8 as a horizontal bar, which passes through the brightness maximum of the light spot 27. Inscribed in FIG. 7 are three lines, which represent the levels of 10%, 50%, and 90% of the maximum brightness. Accordingly, the width of the brightness distribution for the 50% line gives the half-width value of the distribution. A distribution that is favorable in order to promote an optical impression of a light spot that can be continuously adjusted in terms of its position can be achieved when the flanks, as already explained above, do not rise too abruptly. A measure for this is the difference in the widths of the distribution at 10% and 90% of the maximum brightness relative to the half-width value. In the example of FIG. 7, this value is (W10−W90)/FWHM=0.744, where W10 is the width of the brightness distribution at 10% of the maximum brightness, W90 is the width of the brightness distribution at 90% of the maximum brightness, and FWHM is the half-width value. The values W90, W10, and FWHM are marked in FIG. 7. Without any limitation to the illustrated examples, it is preferred when the previously mentioned parameter has a value of at least 0.5. On the other hand, it is also favorable when the distribution is not allowed to be too flat. In this case, the light field would be too broad, this not being desirable for a reading light, because the brightness needs to be concentrated on the object to be illuminated. The pivoting of the light field is then also less clearly perceptible. In accordance with one embodiment, it is therefore provided that the above-mentioned parameter (W10−W90)/FWHM has a value of less than 1.6.

Accordingly, in an enhancement of the invention, it is provided that, for the brightness distribution of the light of one of the light-emitting diodes and, preferably, of all of the light-emitting diodes 31, 32, 33 on a surface 28 illuminated by the lighting device 1 along a line through the brightness maximum of the light distribution, the parameter (W10−W90)/FWHM has a value in the range of 0.5 to 1.6.

Figure 9:
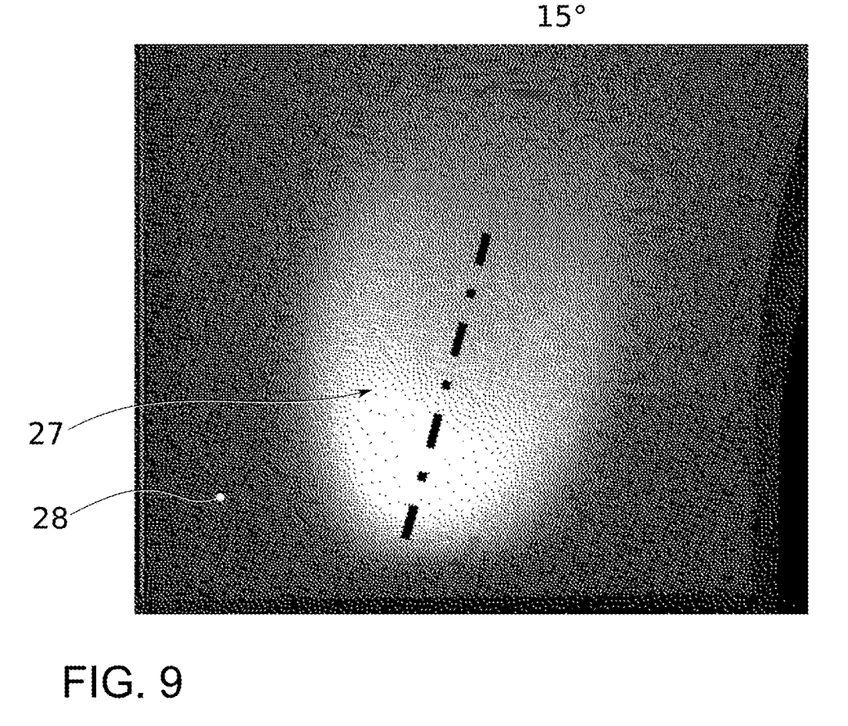
Figure 10:
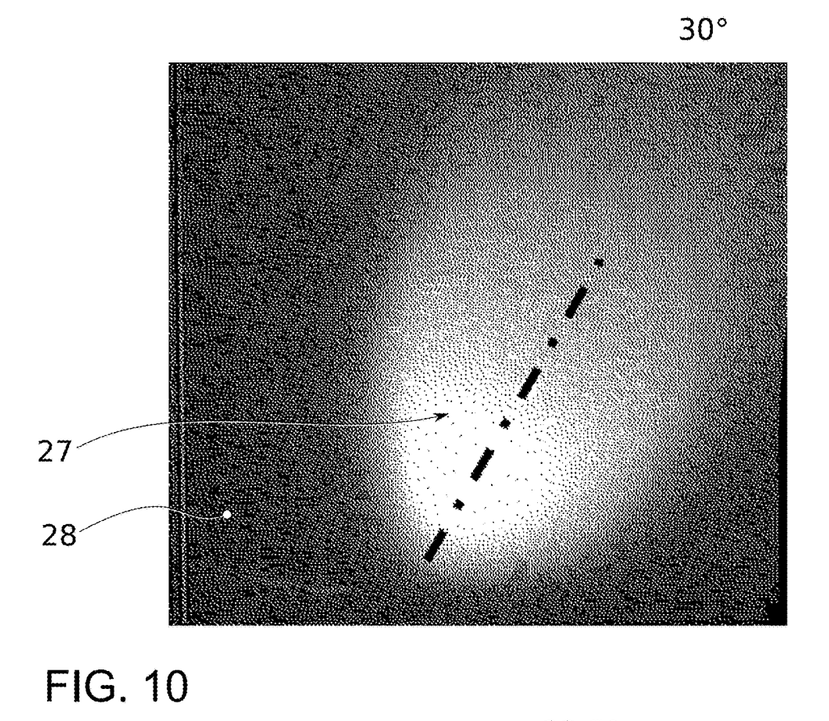
Figure 11:
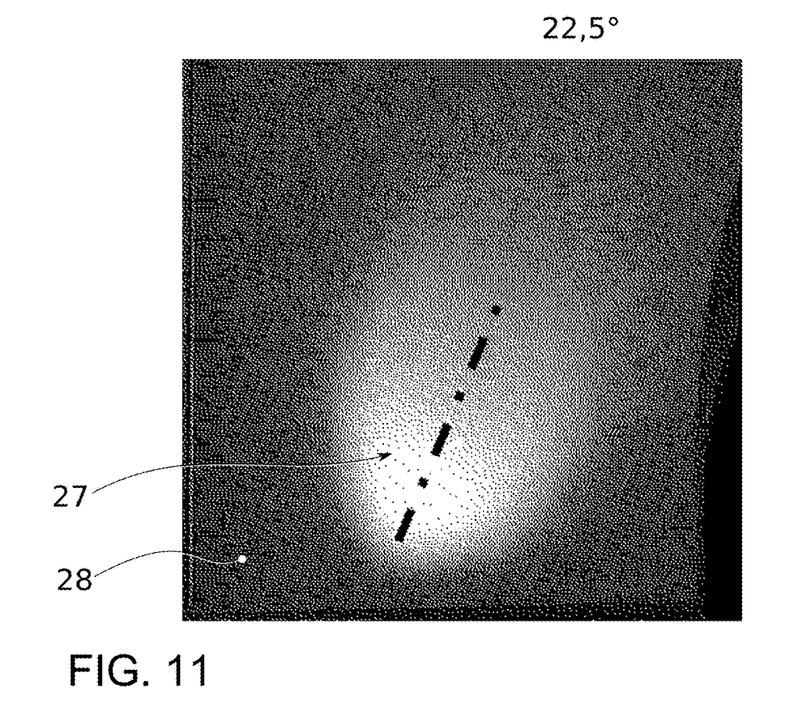

FIGS. 9 to 11 show additional photographic images of the region illuminated by a lighting device or light spot 27 on a surface 28. Here, FIGS. 8 to 10 show light spots 27 that are produced by light cones of individual light-emitting diodes 31, 32, 33, but correspond to the configuration shown in FIG. 6, under different angles. The angle is 0° in the example of FIG. 8, the light cone has an angle of 15° in FIG. 9 with respect to the light cone of FIG. 8, and it has an angle of 30° in the example of FIG. 10. In the example of FIG. 11, the light spot is produced in accordance with the invention by overlap of the adjacent light cones of two light-emitting diodes or by superposition of the light spots from FIG. 9 and FIG. 10. The light intensity for a light-emitting diode is cut in half, so that total brightness of the light field corresponds to that of the light cones of the individual light-emitting diodes. Obtained from this superposition is an effective angle of the mid-point axis or of the direction of the focal point with respect to the direction of the focal point of the light spot from FIG. 8 of 22.5°. As can be further seen, the extension of the light spot in the intermediate position in accordance with FIG. 11 is not noticeably enlarged.

Figure 12A:
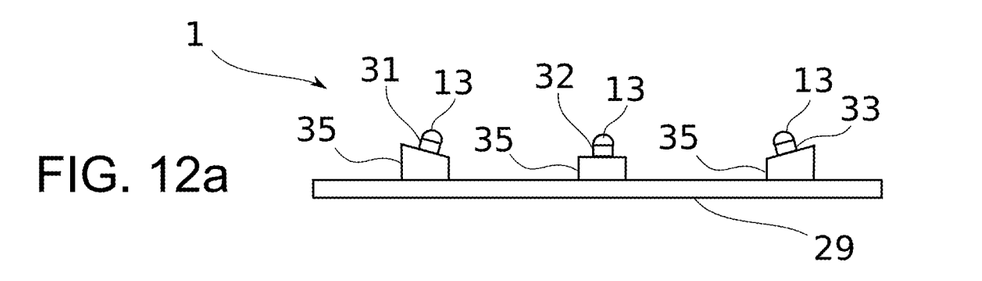
FIGS. 12a, 12b, and 12c show different configurations of the structure of a lighting device.
Figure 12B:
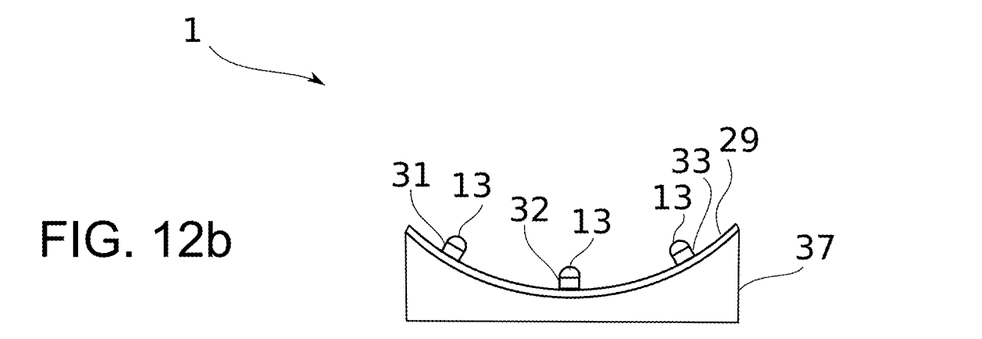
Figure 12C:
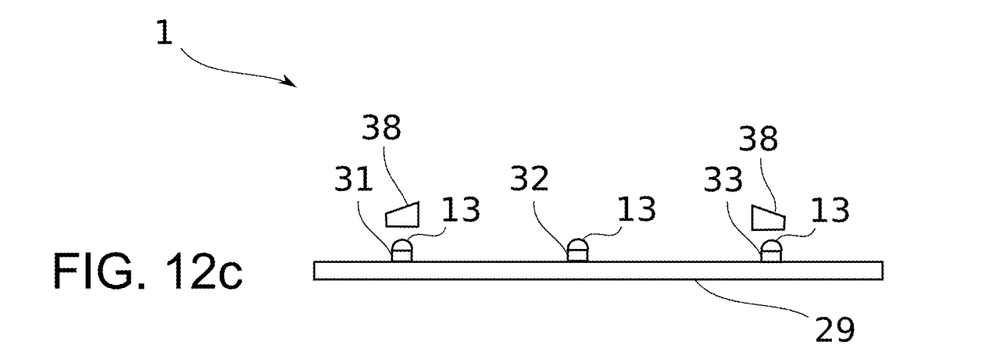

FIGS. 12a, 12b, and 12c show different possibilities for the structure of a lighting device 1 with which a collimation of the light of the light-emitting diodes into light cones of different directions is possible. In accordance with one embodiment, the light-emitting diodes 31, 32, 33, as shown in FIG. 12a, are mounted on pedestals 35, which have partially inclined holding surfaces, so that the light-emitting diodes 31, 32, 33, together with the light-bundling devices 13, are tilted with respect to the surface of the circuit board at the intended angle. In general, without any limitation to the illustrated embodiment, it is thus possible for the light-emitting diodes to be fastened on inclined mounting elements on a support surface and, in particular, on a circuit board. By way of example, lenses are provided as collimating elements 13 in this case. Alternatively or additionally, it is also possible to provide suitable collimating elements or light-bundling elements 13 that capture any undesired laterally radiated light. For example, for this purpose, it is possible for open tubes to cover laterally the light-emitting diodes.

In FIG. 12b, a support base 37 with an arched surface is provided. If the light-emitting diodes 31, 32, 33 are connected to the light-bundling devices 13 by use of this support base, they assume a specific inclination corresponding to the local inclination of the surface. For example, for this purpose, it is also possible to provide a flexible circuit board 29, on which the light-emitting diodes are placed.

Furthermore, as shown FIG. 12c, in general, optical deflecting elements 38 are provided in order to produce light cones of different directions. This embodiment offers the advantage that the light-emitting diodes can be mounted directly on a flat circuit board 29. In this case, the function of the light-bundling devices 13 and of the deflecting elements 38 can also be combined in one optical element (not illustrated). Said optical element is then designed, for example, as an optical free-form element. The optical elements can also be integrated especially advantageously in the housing cover or the front panel. For example, the front panel can have sections formed as lenses.

In addition, the optical elements can also be situated as elements of a component on a common base plate. In particular, in FIG. 12a, this would be a lens array and, in FIG. 12c, an array of free-form elements. In this way, it is possible to simplify the production of the optical elements and also the mounting thereof in the light fixture.

Figure 13:
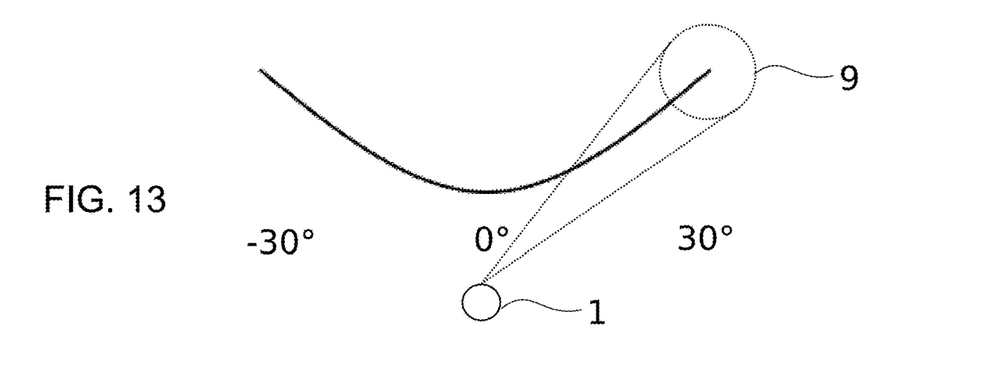
FIG. 13 shows a pivot line of an illuminated region for oblique illumination of a surface by using a conventional lighting device.

FIG. 13 shows a pivot line 45 of a region illuminated by a conventional lighting device for oblique illumination of a surface. The light field 9 moves along this pivot line 45 when the light source is pivoted mechanically between an angle of −30° and an angle of +30° and the surface to be illuminated is illuminated obliquely. Because the pivot axis is oblique to the surface, the nonlinear form of the line is obtained. In particular, the pivot line represents the edge of a conic section and is typically a hyperbola.

By use of the invention, it is now possible, through suitable alignment of the individual light sources and light-bundling devices 13, to adjust, in principle, a pivot line 45 of any desired shape, even for oblique illumination of a surface to be illuminated.

Figure 14:
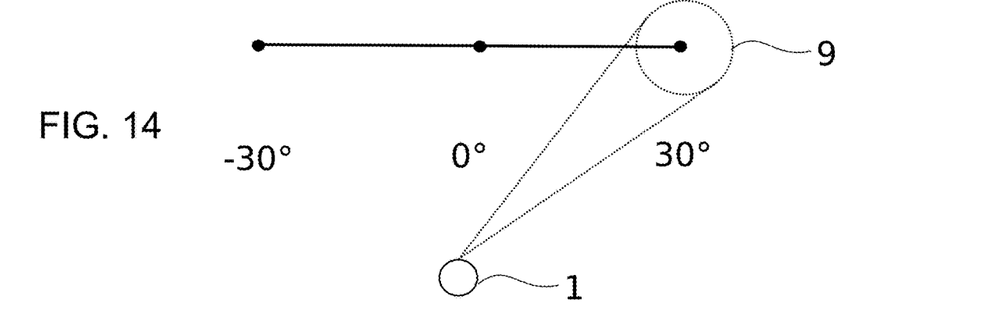
FIGS. 14 and 15 show pivot lines that the light field of the lighting device travels during a movement, in accordance with an embodiment of the invention.
Figure 15:
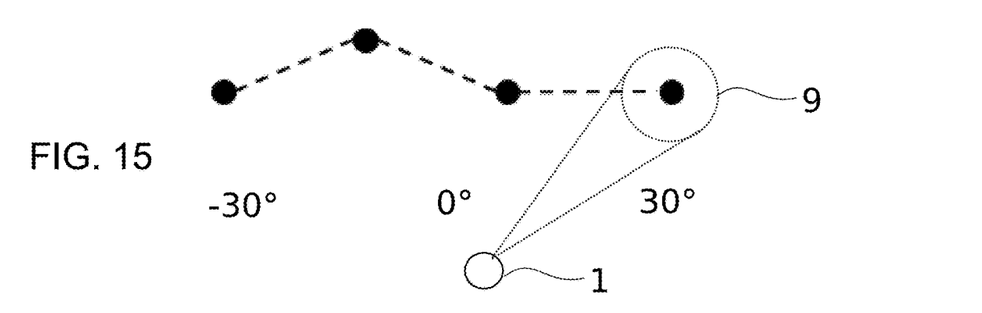

FIG. 14 shows such an example. Here, too, a surface to be illuminated is irradiated obliquely by the lighting device 1. However, the individual light cones of the light-emitting diodes are aligned in such a way that the fulcrums thereof lie on a straight line. Accordingly, the intermediate positions produced by superposition of the light cones also lie on the rectilinear pivot line 45. Differently shaped paths or pivot lines 45 can also be produced by way of a corresponding alignment of the light cones of the light-emitting diodes. For this purpose, FIG. 15 shows another example, in which a part of the pivot line 45 deviates from a straight path. Such a path might be desirable, for example, when a part of the surface to be illuminated is arched, so that the nonlinear path of the pivot line compensates once again for the arching and the impression of a rectilinear pivoting is obtained. Common to the exemplary embodiments of FIG. 14 and FIG. 15, without any limitation to the special illustrated embodiments, is the fact that the beam directions of the light cones of the at least three light-emitting diodes do not all lie in one plane.

The light spot positions produced by the lighting device, without any superimposed blending of a plurality of light cones, can also be arranged along a—not necessarily straight—one-dimensional line. However, in another embodiment of the invention, they can also cover a two-dimensional field, so that the positions can be adjusted not only in one dimension, but also in two dimensions. In this case, any desired position of a light spot is achieved not only through the superposition of just two light cones, but also through the superimposed blending of a plurality of light cones, in particular three light cones in a triangular arrangement or four light cones in a rectangular or square arrangement.

Figure 16:
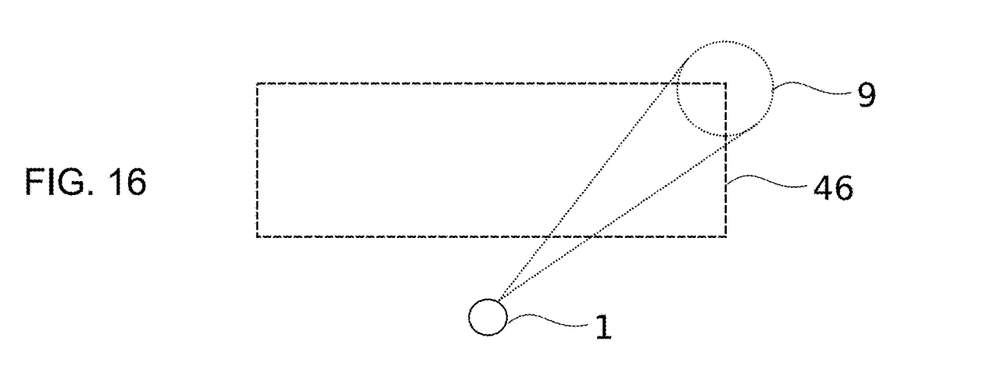
FIG. 16 shows an embodiment with a two-dimensional region of pivot.

For this purpose, FIG. 16 shows an exemplary embodiment. The directions of the light cones of the light-emitting diodes or, accordingly, of the light spots produced by the light cones are distributed in two spatial directions, so that, through the superposition of the light cones and the adjustment of intermediate positions, the light field can be pivoted within a two-dimensional pivot region 46. The pivot region 46 in the illustrated example is a rectangular region, but can also have any other desired shape.

Accordingly, in an enhancement, the invention provides that the light cones of the light-emitting diodes 31, 32, 33 are aligned in such a way that the regions illuminated by the light cones are distributed in two spatial directions, so that, by superposition of the light cones and, accordingly, by adjustment of intermediate positions, the light field 9 or the region illuminated by the lighting device can be moved, and preferably, can be pivoted within a two-dimensional pivot region 46.

The lighting device according to the invention 1 can be utilized, in particular, as a reading light for adjustable furniture for sitting or lying, for which the position of the region to be illuminated thus changes with a sitting or lying position. Typical applications for this purpose are reading lights in airplanes, ships, trains, automobiles, or other vehicles. In addition, these lights are also suitable, in particular, for adjustable beds, in particular patient beds in hospitals or similar equipment.

LIST OF REFERENCE NUMBERS 1 lighting device
3 light source arrangement
5 adjusting device
7 actuating circuit
9 light field
11 focal point of 9
13 light-bundling device
15 front panel
16 Housing
17 Window
18, 19 control element
20 touch-sensitive slider
21 on-off switch element
22 touch-sensitive matrix controller
25 Ceiling
27 light spot
28 illuminated surface
29 circuit board
31, 32, 33 light-emitting diodes
35 Pedestal
37 support base with arched surface
38 optical deflecting element
41, 42, 43 light cones
45 pivot line
46 two-dimensional pivot region
50 sliding adjustment device
51 rotary adjustment device
410, 420, 430 focal points of the light cones
411, 421, 431 mid-point axes of the light cones

What is claimed is:

1. A lighting device, comprising:
    a light source arrangement with a plurality of light-emitting diodes, the light source arrangement emitting light that is bundled so that differently directed light cones overlap in a light field,
    an adjusting device configured to output an actuating signal corresponding to a direction of illumination; and
    an actuating circuit connected to the adjusting device, wherein the adjusting device adjust intermediate stages for which the plurality of light-emitting diodes can be operated jointly and with variable light intensity by the actuating circuit so that a focal point of the light field lies between focal points of each of the light cones, wherein alignment of the light field can be produced without any mechanical parts.

2. The lighting device of claim 1, wherein the plurality of light-emitting diodes each irradiate light in an immobile light cone.

3. The lighting device of claim 1, wherein the actuating circuit actuates the plurality of light-emitting diodes in such a way that a brightness of the light field in the intermediate stages remains constant or fluctuates by at most 20%.

4. The lighting device of claim 1, wherein the adjusting device adjusts the plurality of light-emitting diodes so that a mid-point brightness or a maximum brightness in the intermediate stages remains constant or fluctuates by at most 20%.

5. The lighting device of claim 1, wherein the adjusting device and the actuating circuit interact in such a way that, with each successive operation of the actuating circuit, the focal point of the light field moves.

6. The lighting device of claim 1, wherein the adjusting device comprises a sliding adjustment device, wherein the sliding adjusting device and the actuating circuit interact in such a way that different slide settings of the slide adjustment device correspond to different directions of illumination.

7. The lighting device of claim 1, wherein the adjusting device comprises a rotary adjustment device, wherein the rotary adjusting device and the actuating circuit interact in such a way that different rotary settings of the rotary adjustment device correspond to different directions of illumination.

8. The lighting device of claim 1, further comprising a recessed light fixture and a front panel, the plurality of light-emitting diodes being arranged in the recessed light fixture and behind the front panel, wherein the front panel is at least partially transparent.

9. The lighting device of claim 8, further comprising a control element integrated in the front panel, the control element being configured to operate the actuating element.

10. The lighting device of claim 1, further comprising a touch-sensitive control element configured to operate the actuating element.

11. The lighting device of claim 1, further comprising a second adjusting device, the second adjusting device being connected to the actuating circuit so as to adjust a light intensity that is emitted overall by the lighting device.

12. The lighting device of claim 1, wherein the actuating circuit is configured, in response to a change in the actuating signal, to adjust an intermediate setting with a time delay in such a way that a brightness of the plurality of light-emitting diodes adjusts gradually over time or in a plurality of successive intermediate settings.

13. The lighting device of claim 1, further comprising an angle between the focal points of each of the light cones have a maximum excursion of between 30° and 80°.

14. The lighting device of claim 1, wherein each of the light cones spans a range of 10° to 20°.

15. The lighting device of claim 1, further comprising a feature selected from a group consisting of:
    at least a part of light emitted from the plurality of light-emitting diodes is collimated in such a way that an aperture angle of the light cones is larger than the angle between the light cones;
    at least a part of light emitted from the plurality of light-emitting diodes is collimated in such a way that an angle between adjacent light cones is at most equal to half an aperture angle of the light cones;
    at least a part of light emitted from the plurality of light-emitting diodes is collimated in such a way that at least one of the light cones overlaps both a second, adjacent light cone and a third light cone, which is adjacent to the second light cone;
    the plurality of light-emitting diodes are fastened on suitable mounting elements on a support base;
    the plurality of light-emitting diodes are joined to a support base having an arched surface; and
    optical deflecting elements are provided in order to produce the light cones of different directions.

16. The lighting device of claim 1, wherein the plurality of light-emitting diodes have a brightness distribution on a surface along a line through a brightness maximum of the light distribution where a parameter (W10–W90)/FWHM has a value in the range of 0.5 to 1.6, where W10 is a width of the brightness distribution at 10% of the brightness maximum, W90 is a width of the brightness distribution at 90% of the brightness maximum, and FWHM is a half-width value of the brightness distribution.

17. The lighting device of claim 1, wherein the plurality of light-emitting diodes comprises at least three light-emitting diodes, wherein the beam directions of the light cones do not all lie in one plane.

18. The lighting device of claim 1, wherein the plurality of light-emitting diodes comprises at least three light-emitting diodes, wherein the light cones are aligned such that regions illuminated by the light cones are distributed in two spatial directions, so that, by superposition of the light cones and adjustment of intermediate positions, the light field can be moved within a two-dimensional pivot region.

19. The lighting device of claim 1, where the lighting device is sized and configured for a use selected from a group consisting of a reading light for adjustable sitting furniture, a reading light for adjustable lying furniture, a reading light for a hospital bed, a reading light for airplane seat, a reading light for a ship seat, a reading light for a train seat, a reading light for an automobile seat, and a reading light for a vehicle.

20. A lighting device, comprising:
- a light source arrangement with a plurality of light-emitting diodes, the light source arrangement emitting light that is bundled so that differently directed light cones overlap in a light field,
- an adjusting device configured to output an actuating signal corresponding to a direction of illumination; and
- an actuating circuit connected to the adjusting device, wherein the adjusting device adjust intermediate stages for which the plurality of light-emitting diodes can be operated jointly and with variable light intensity by the actuating circuit so that a focal point of the light field lies between focal points of each of the light cones,
- wherein the plurality of light-emitting diodes have a brightness distribution on a surface along a line through a brightness maximum of the light distribution where a parameter (W10−W90)/FWHM has a value in the range of 0.5 to 1.6, where W10 is a width of the brightness distribution at 10% of the brightness maximum, W90 is a width of the brightness distribution at 90% of the brightness maximum, and FWHM is a half-width value of the brightness distribution.

21. A lighting device, comprising:
- a light source arrangement with a plurality of light-emitting diodes, the light source arrangement emitting light that is bundled so that differently directed light cones overlap in a light field;
- an adjusting device configured to output an actuating signal corresponding to a direction of illumination; and
- an actuating circuit connected to the adjusting device, wherein the adjusting device adjust intermediate stages for which the plurality of light-emitting diodes can be operated jointly and with variable light intensity by the actuating circuit so that a focal point of the light field lies between focal points of each of the light cones,
- wherein each of the plurality of light-emitting diodes comprise a collimation device that collimates or bundles the light of the plurality of light-emitting diodes to form the light cones.

* * * * *